UNITED STATES PATENT OFFICE.

MAX HESSENLAND, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

VAT DYESTUFF OF THE ANTRAQUINONE SERIES AND PROCESS OF MAKING SAME.

1,002,270.     Specification of Letters Patent.     Patented Sept. 5, 1911.

No Drawing.     Application filed October 31, 1910. Serial No. 589,998.

*To all whom it may concern:*

Be it known that I, MAX HESSENLAND, Ph. D., chemist, a citizen of the Empire of Germany, residing at Höchst-on-the-Main, Germany, have invented certain new and useful Improvements in New Vat Dyestuffs of the Anthraquinone Series and Processes of Making Same, of which the following is a specification.

I have found that valuable vat dyestuffs can be obtained by introducing into the amino group of the 4-amino-anthraquinone-$\alpha$-acridones, radicals, such as an alkyl-, aryl- or acidyl group, or an anthraquinone residue. Thus new dyestuffs are produced the relation of which to the blue 4-amino-anthraquinone-$\alpha$-acridone (described in U. S. application Sr. No. 589,997 filed Oct. 31, 1910) is apparent from the following formulæ:

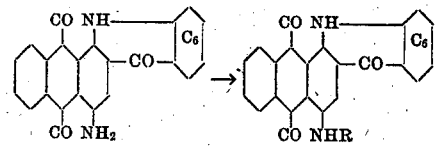

In the latter formula $C_6$ stands for a benzene residue and R for instance for a methyl, naphthyl, bromophenyl, benzoyl or anthraquinonyl.

The process for obtaining the new dyestuffs consists in causing halogen compounds of the above-mentioned radicals to react with the said 4-aminoanthraquinone-$\alpha$-acridones.

Example: There is boiled for 5 hours a mixture consisting of 10 parts of 4-amino-1.2-anthraquinone-acridone, — obtainable from 4-amino-1-anthraquinonyl-anthranilic acid for instance by the action of chlorosulfonic acid,—10 parts of $\alpha$-chloroanthraquinone, one part of cuprous chlorid, 5 parts of anhydrous sodium acetate and 400 parts of nitrobenzene. The nitrobenzene is then removed by distillation with steam and the remaining product forms a black powder, which is insoluble in water, alcohol, ether, alkalis and diluted mineral acids, but dissolves in concentrated sulfuric acid to an olive-green solution. In alkaline hydrosulfite it dissolves to a reddish-brown solution and dyes cotton gray to deep-black tints of excellent fastness. In an analogous manner other organic radicals are introduced into the amino group of the 4-amino-1.2-anthraquinone-acridone.

The following tabular statement shows the properties of some of the dyestuffs obtainable by the new process:

| Constitution. | Color of the Substance. | Solution in concentrated sulfuric acid. | Color of the vat. | Dyeings on Cotton. |
|---|---|---|---|---|
| [structure] +$\alpha$-chloroanthraquinone... | Black................. | Olive-green........... | Reddish-brown..... | Gray to black. |
| " " " +$\beta$-chloroanthraquinone... | Dark-green.......... | ....." ............. | ....." ............. | Grayish-green. |
| " " " +benzoylchlorid........... | Blue................. | Reddish-brown..... | Violet............. | Reddish-blue. |
| " " " +bromobenzene........... | Dark-green.......... | Brown.............. | ....." ............. | Green. |
| " " " +p-dibromobenzene....... | ....." ............. | Grayish-brown..... | ....." ............. | Green. |
| " " " +$\alpha$-chloronaphthalene.... | Blue................. | ....." ............. | Reddish-brown..... | Bluish-gray. |
| " " " +$\beta$-chloronaphthalene.... | Dark-green.......... | Brown.............. | Violet............. | Yellowish-green. |

Having now described my invention, what I claim is:

1. As products, new vat-dyestuffs, namely the 4-aminoanthraquinone-$\alpha$-acridones containing an organic radical linked in the amino group, said dyestuffs being dark powders, insoluble in water, alcohol, ether, alkalis and diluted mineral acids, dissolving in concentrated sulfuric acid with a green to brown color, in alkaline hydrosulfite with a violet to brown color and dyeing from these solutions cotton dark tints of great fastness.

2. As a product, the new vat dyestuff, namely the 4-amino-anthraquinone-α-acridone which contains the radical-α-anthraquinonyl linked in the amino group, said dyestuff being a black powder, insoluble in water, alcohol, ether, alkalis, and diluted mineral acids, dissolving in concentrated sulfuric acid with an olive-green color, in alkaline hydrosulfite with a reddish-brown color and dyeing from this solution cotton gray to black tints.

3. The process of producing vat dyestuffs, which consists in reacting on a 4-amino-anthraquinone-α-acridone with a halogen compound of an organic radical.

In testimony whereof, I affix my signature in presence of two witnesses.

MAX HESSENLAND.

Witnesses:
CARL GRUND,
JEAN GRUND.